United States Patent [19]

Travis

[11] 4,425,049

[45] Jan. 10, 1984

[54] JOINING ASSEMBLY WITH LOCKING MEANS FOR ADJUSTABLE STORAGE RACKS

[75] Inventor: Merton A. Travis, Shingle Springs, Calif.

[73] Assignee: Travis Handling Systems, Inc., Shingle Springs, Calif.

[21] Appl. No.: 248,058

[22] Filed: Mar. 27, 1981

[51] Int. Cl.³ .............................................. F16B 9/02
[52] U.S. Cl. ..................................... 403/237; 403/254; 403/316; 403/234; 211/191; 292/302
[58] Field of Search ............... 403/235, 237, 253, 254, 403/315, 316, 317, 234; 211/191, 192; 292/302; 24/263 R

[56] References Cited

U.S. PATENT DOCUMENTS

| 826,621 | 7/1906 | Sticht | 403/315 X |
| 2,380,782 | 7/1945 | Owens | 292/302 |
| 2,932,368 | 4/1960 | Schell | 211/192 X |
| 3,392,848 | 7/1968 | McConnell | 403/315 X |
| 3,422,962 | 1/1969 | Burns | 211/191 |
| 3,741,405 | 6/1973 | McConnell | 403/315 X |

Primary Examiner—Andrew V. Kundrat
Assistant Examiner—Joseph A. Fischetti
Attorney, Agent, or Firm—Fulwider, Patton, Rieber, Lee & Utecht

[57] ABSTRACT

For use in adjustable storage rack systems comprising individual load beams or skeleton shelves having brackets connecting with upright support columns, a locking means is provided for securing the bracket to the column against accidental disconnection. More specifically, where the connection between the bracket and the support column comprises a pin on the bracket which is engaged in a slot on the support column, the locking means is engaged on the pin and prevents removal of the pin from the slot, thereby preventing disconnection of the bracket from the support column.

8 Claims, 3 Drawing Figures

JOINING ASSEMBLY WITH LOCKING MEANS FOR ADJUSTABLE STORAGE RACKS

BACKGROUND OF THE INVENTION

This invention relates generally to adjustable storage racks, and more particularly to connecting means specially adapted to storage racks which are comprised of skeleton shelves or individual load beams attached to upright support columns.

Adjustable racks with unobstructed multi-level shelving capabilities have found utility in a variety of commercial enterprises, but especially in those where storage requirements constantly vary, due to changes in the quantity or the size of the items to be stored. In fact, the ability to respond rapidly and cheaply to fluctuating storage needs, such as by increasing storage space or by just rearranging existing storage spaces, is often crucial to an enterprise's successful operation.

Various storage rack systems, including structures using skeleton shelves, that are easy to rearrange, assemble and disassemble, either manually or using mechanical means (e.g., a forklift) have been known for a number of years. By way of example, several forms of such systems may be found in U.S. Pat. Nos. 2,729,342; 2,984,363; 2,925,920; and 3,120,200.

Although skeleton frame storage rack systems with shelves or individual load beams fulfill most of the abovenoted requirements for acceptable storage racks, experience with such structures has been less than satisfactory, primarily because of the inability of those structures to withstand the jostling regularly encountered during everyday use. Specifically, accidental strong collisions with the storage rack, such as jolts resulting from careless use of forklifts and other machinery, frequently induce disengagement of the connecting assembly between rack components. Once the rack separates from one of the points of connection to its support columns, the shelves supported thereon and any stored items may fall.

In addition to the clear risks to human safety posed by falling shelves and stored items, the stored items could, themselves, be severely damaged or even completely ruined. Furthermore, it entails additional economic hardship to rebuild the storage system, including wasting substantial personnel time and losing access to the entire storage area during the period of rebuilding.

Thus, there exists a pronounced need for an improved storage rack system that effectively negates the effect that accidental jostling has on such storage racks. The present invention fulfills this need.

SUMMARY OF THE INVENTION

The present invention provides a novel joining assembly with locking means for adjustable storage racks that substantially improves the stability of adjustable storage racks, particularly storage racks comprising individual load beams or skeleton shelves, and that significantly reduces the likelihood that inadvertent jostling of the racks will cause disengagement of the joining assembly. Moreover, the novel construction of the present invention is relatively inexpensive to manufacture, is trouble-free and reliable in use, and is functional without unduly hampering or complicating rearrangement, assembly or disassembly of the racks.

A common storage rack structure incorporating individual load beams and/or skeleton shelves comprises a plurality of upright support members and a plurality of brackets, which are shaped such that a channel member and a bracket fit together. A load beam has a bracket at each end, and a skeleton shelf generally has a bracket at each of its corners. A bracket and a channel member can be connected together by various connecting means.

A typical connecting means comprises an inwardly directed pin on an inside wall of the bracket and a slot formed in a wall of the channel member. The slot has an enlarged portal in an upper portion of the slot and a seat portion in the lower portion of the slot. The pin has a head larger than the seat portion of the slot, but smaller than the portal, allowing it to move through the portal and engage into the seat portion of the slot to fully connect the bracket with the channel member.

In accordance with the present invention, a locking means, which is larger than the portal of the slot in the channel member, is arranged to engage the pin when the above-described bracket and channel member are fully connected by the connecting means, thereby restricting the pin from moving through the portal, and thus, preventing disengagement of the connecting means. The locking means has a slot for engaging the head of the pin, the slot having a lower entry portion larger than the pin head, and an upper seat portion smaller than the pin head.

More specifically, and as embodied in the preferred mode of the invention shown herein for purposes of illustration, the locking means has a finger, which protrudes through the portal when the locking means is engaged with the pin head, thus limiting movement of the bracket in relation to the channel member and preventing accidental disengagement. As an additional feature of the preferred embodiment, the finger of the locking member is shaped such that when the locking member is engaged, it protrudes through the portal and extends over an upper edge of the bracket and partially down across a wall of the bracket to securely hold the bracket in place.

For a sturdy connection of the bracket and channel member, the bracket may have two headed pins on its side wall that engage two corresponding slots on the channel member. Optimum connection can be obtained by slots comprising an inclined bayonet slot formed in a side wall of the channel member and an elongated portal formed in the front wall of the channel member and opening into the upper portion of the bayonet slot.

For added flexibility and adaptability of the storage rack, the supporting channel member may be approximately U-shaped with a central front wall and two parallel side walls generally perpendicular to the front wall. The channel member may also have pairs of vertically spaced slots such as those described above.

Other features and advantages of the present invention will become apparent from the following detailed description, taken in conjunction with the accompanying drawings, which illustrate, by way of example, the principles of the invention.

DETAILED DESCRIPTION

Figure 1:
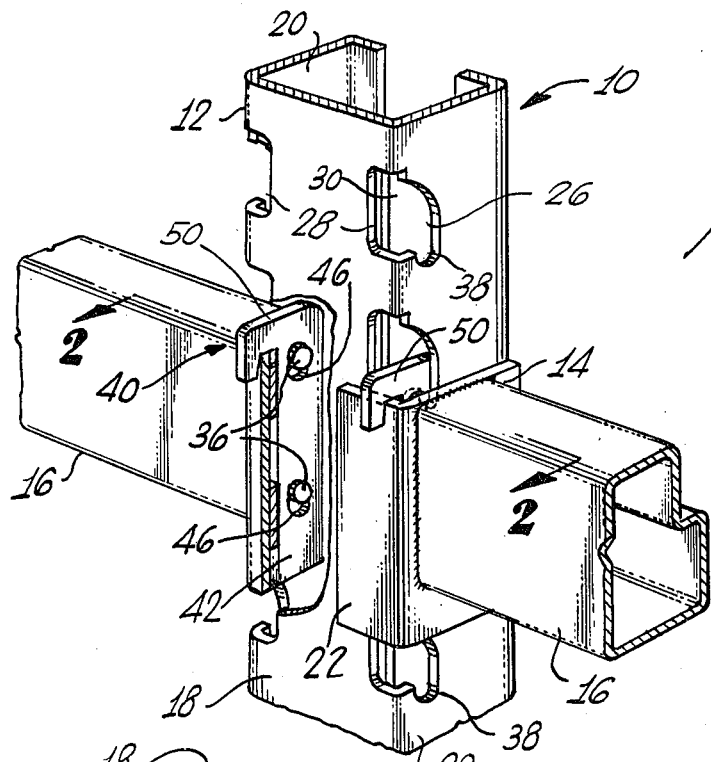
FIG. 1 is a partially cut-away perspective view of a portion of a storage rack incorporating the novel joining assembly of this invention.
Figure 2:
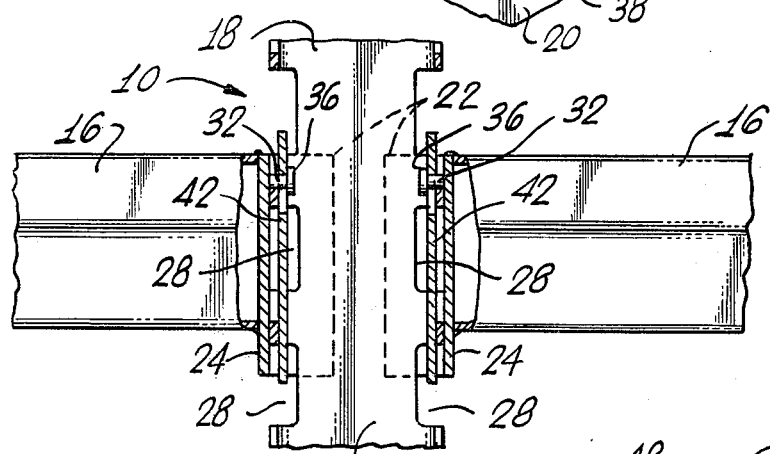
FIG. 2 is a fragmentary cross-sectional view of a portion of the storage rack taken substantially along line 2—2 of FIG. 1.

As shown in the drawings for purposes of illustration, the present invention is embodied in a joining assembly for adjustable storage racks, particularly storage racks comprising individual load beams or skeleton shelves, indicated generally by reference numeral 10 in FIGS. 1 and 2. In this instance, an upright channel member 12 is connected to a pair of brackets 14, each bracket having a load beam 16 extending therefrom. The load beams 16 can be arranged to accept shelves (not shown) to provide storage space. An alternative embodiment not shown in the drawings would include a substantially rectangular skeleton storage rack having brackets at each corner that can be connected to the upright support columns 12 to provide a support for shelves. In the adjustable storage racks systems of the type described above, it is highly desirable to prevent any brackets having load beams, or any brackets on a skeleton shelf, from becoming disconnected from their supporting column members, so that any shelves will not lose support and fall.

Figure 3:
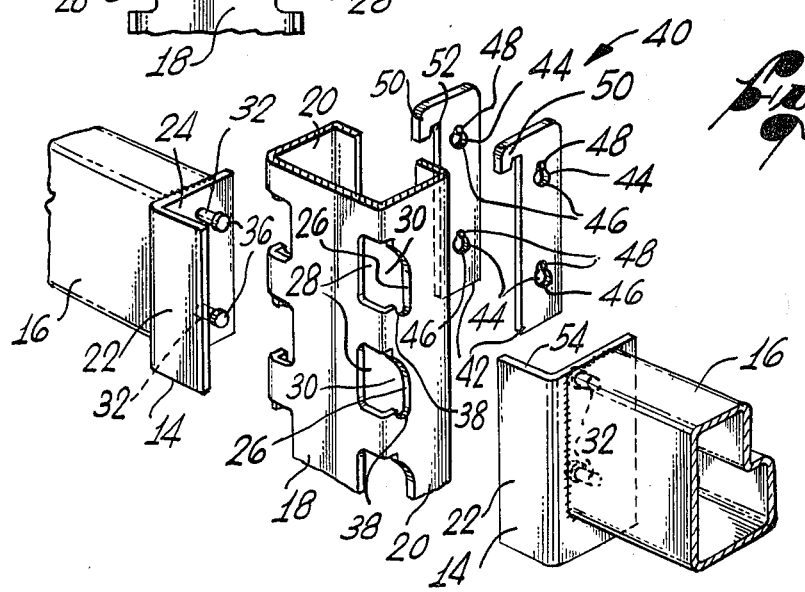
FIG. 3 is an exploded perspective view of the storage rack assembly illustrated in FIG. 1.

The detailed construction of the brackets 14 and column member 12 is best illustrated in FIG. 3, wherein it can be seen that the channel member 12 has a vertical front wall 18 and a side wall 20 substantially perpendicular to the front wall 18. The bracket 14 has a vertical front wall 22 and a substantially perpendicular side wall 24, and is shaped such that said channel member 12 and said bracket 14 can fit together. A load beam 16 projects generally perpendicularly from the side wall 24 and generally away from the front wall 22 of the bracket 14.

To connect the bracket 14 with the channel member 12, a connecting assembly means is provided. The connecting means comprises a slot 26 formed in the side wall 20 of the channel member 12, and an enlarged portal 28 formed in the front wall 18 of the channel member and opening into an upper portion 30 of the slot 26. The connecting means also includes an inwardly directed pin 32 projecting from the bracket side wall 24. For fully connecting the bracket 14 with the channel member 12, the pins 32, which preferably have heads 36, first move through the portal 28, then pass through the upper portion 30 of the slot 26, and finally engage the seat portion 38. The pin head 36 is smaller than the portal 28 but larger than the seat portion 38 of the slot 26 to permit a sturdy connection between the bracket 14 and the channel member 12. The connecting means can be easily disengaged by moving the pins 32 upward and then out through the portals 28.

In accordance with the present invention, a locking means is provided for restricting the pin 32 from moving through the portal 28 after the bracket 14 and channel member 12 have been connected. The locking means of the preferred embodiment, generally designated by reference numeral 40 in FIGS. 1 and 3, is attached to the connecting assembly, so that when the bracket 14 is connected with the channel member 12, accidental disengagement of the connecting means is prevented, dramatically improving the safety of the entire joining assembly 10.

As best seen in FIG. 3, each locking means 40 comprise two substantially flat plates 42, which are larger than the portals 28 in the channel member 12. To permit mounting the plate 42 on the connecting assembly, the plate includes at least one slot 44. Each slot 44 has a lower entry portion 46 larger than the pin head 36 and an upper seat portion 48 smaller than the pin head 36. The slots 44 are spaced apart on the flat plate 42, so that when the bracket 14 and the channel member 12 are connected, the locking means 40 can engage the pins 32.

The operation of the locking means 40 is best seen in FIGS. 1 and 2. In FIG. 1, the column member 12 is shown partly cut away to facilitate understanding the present invention. The bracket 14 is fully connected with the column member 12, and the pins 32 are engaged with the slots 26 at the seat portions 38 (FIG. 2). The pins 32 are also engaged with the slots 44 of the locking means 40 at the upper seat portion 48. The pin head 36 restricts lateral movement of the locking means 40 to prevent its disengagement. When the pins 32 are engaged by the locking means 40, the pins cannot move through the portals 28, and therefore the bracket 14 cannot disconnect from the channel member 12.

For simple installation of the locking means 40, the slot 44 has a lower entry portion 46, which is larger than the pinhead 36. After the bracket 14 and column member 12 have been connected, and the pins 32 engaged with the seat portion 38 of the slot 26, the locking means 40 can be attached. This can be accomplished by passing the lower entry portions 46 of the locking means slots 44 around the pin heads 36, and then dropping the locking means so that the upper seat portions 48 engage the pins 32. For simple disengagement, the procedure can be reversed, and the bracket 14 then disconnected from the channel member 12.

In the preferred embodiment, each locking means 40 has a finger 50, which can be bent to define a recess 52, extending from an upper portion of the flat plate 42. When a locking means 40 is engaged, the finger 50 protrudes through a portal 28 and can restrict upward movement of the bracket 14 with respect to the column member 12 by abutting the top of the portal 28. The recess 52 can fit over the top 54 of the bracket front wall 22, further restricting any relative movement between the bracket 14 and the column member 12.

From the foregoing, it will be appreciated that the locking means 40 of the present invention provides protection against accidental disconnection of the bracket 14, and load beam 16 from an upright support column member 12. Further, the locking means 40 of the present invention is inexpensive to manufacture and can be conveniently installed in existing adjustable storage rack systems without modifying the rack structure components or unduly complicating assembly or disassembly of the racks.

While a particular form of the invention has been illustrated and described, it will be apparent that various modifications can be made without departing from the spirit and scope of the invention.

I claim:

1. A joining assembly for an adjustable storage rack, comprising:
   an upright channel member having a vertical front wall and a side wall substantially perpendicular to the front wall;
   a bracket from which a load beam extends, said bracket having a vertical front wall and a substantially perpendicular side wall and shaped such that said channel member and said bracket fit together;
   connecting means for connecting said channel member with said bracket, said connecting means comprising a slot formed in a wall of said channel member, said slot including an enlarged portal in an upper portion of the slot and a smaller seat portion in a lower portion of the slot, and an inwardly directed pin on an inside wall of the bracket, said pin having a head larger than said lower portion of the slot and smaller than said portal, so that said pin can move through said portal and engage said seat portion, to fully connect said bracket with said channel member; and locking means larger than said portal and including a slot with a lower entry portion larger than the pin head and an upper seat portion smaller than the pin head, said locking means being engageable with the pin when said bracket and channel member are fully connected, whereby the pin is restricted from moving through the portal, preventing disengagement of said connection means, and said locking means further including a finger which projects through the portal when said locking means is engaged on said pin.

2. The joining assembly as defined in claim 1 wherein the finger of said locking means extends over an upper edge and partially down across a wall of said bracket.

3. A joining assembly for an adjustable storage rack, comprising:

an upright channel member having a vertical front wall and a side wall substantially perpendicular to the front wall;

a bracket from which a load beam extends, said bracket having a vertical front wall and a substantially perpendicular side wall and shaped such that said channel member and said bracket fit together;

connecting means for connecting said channel member with said bracket, said connecting means comprising a slot formed in a wall of said channel member, said slot including an enlarged portal in an upper portion of the slot and a smaller seat portion in a lower portion of the slot, said seat portion of the slot formed in said channel member being an inclined bayonet slot formed in the side wall of said channel member and the portal being formed in a portion of the front wall of said channel member adjacent to the side wall, said portal opening into an upper portion of said bayonet slot, and an inwardly directed pin on the inside wall of the bracket, said pin having a head larger than said lower portion of the slot and smaller than said portal, so that said pin can move through said portal and engage said seat portion, to fully connect said bracket with said channel member; and locking means larger than said portal and including a slot with a lower entry portion larger than the pin head and an upper seat portion smaller than the pin head, said locking means being engageable with the pin when said bracket and channel member are fully connected, whereby the pin is restricted from moving through the portal, preventing disengagement of said connecting means.

4. The joining assembly as defined in claim 3 wherein said locking means includes a finger which projects through the portal when said locking means is engaged on said pin.

5. The joining assembly as defined in claim 4 wherein the finger of said locking means extends over an upper edge and partially down across a wall of said bracket.

6. A joining assembly for an adjustable storage rack, comprising:

an upright channel member having a vertical front wall and a side wall substantially perpendicular to the front wall;

a bracket from which a load beam extends, said bracket having a vertical front wall and a substantially perpendicular side wall and shaped such that said channel member and said bracket fit together;

connecting means for connecting said channel member with said bracket, said connecting means comprising an inwardly directed pair of pins on an inside wall of said bracket and a pair of corresponding slots on said channel member for locking engagement with said pair of pins, said slots including an enlarged portal in an upper portion of each slot and a smaller seat portion in a lower portion of each slot, said pins having heads smaller than said portals, so that said pins can move through said portals and engage said seat portions, to fully connect said bracket with said channel member; and locking means larger than said portal and including a slot with a lower entry portion larger than the pin head and an upper seat portion smaller than the pin head, said locking means being engageable with the pin when said bracket and channel member are fully connected, whereby the pin is restricted from moving through the portal, preventing disengagement of said connecting means, and wherein said locking means includes a finger which projects through said portal when said locking means in engaged on said pins.

7. The joining assembly as defined in claim 6 wherein the finger of said locking means extends over an upper edge and partially down across a wall of said bracket.

8. A joining assembly for an adjustable storage rack comprising:

an upright channel member having a vertical front wall and two parallel side walls generally perpendicular to the front wall and having pairs of vertically spaced slots;

a bracket from which a load beam extends, said bracket having a vertical front wall and a substantially perpendicular side wall and shaped such that said channel member and said bracket fit together;

connecting means for connecting said channel member with said bracket, said connecting means comprising two inwardly directed headed pins on the inside of the side wall of the bracket and two corresponding slots on the channel member, each slot comprising an inclined bayonet slot formed in a side wall of the channel member and an elongated portal formed in an adjacent portion of the front wall of the channel member, such that said pins can move through the portals and engage the bayonet slots to fully connect said bracket with said channel member;

locking means larger than said portal and including two slots corresponding to the pins on the bracket member, each with a lower entry portion larger than the pin head and an upper seat portion smaller than the pin head, said locking means being engageable with the pins when said bracket and said channel member are fully connected to restrict said pins from moving through the portals, thereby preventing disengagement of said bracket from said channel member; and said locking means further including a finger that projects through the upper portal of each slot engaged by said pins and also extends over an upper edge and partially down across a wall of said bracket.

* * * * *

UNITED STATES PATENT AND TRADEMARK OFFICE
CERTIFICATE OF CORRECTION

PATENT NO.  : 4,425,049

DATED       : January 10, 1984

INVENTOR(S) : MERTON A. TRAVIS

It is certified that error appears in the above-identified patent and that said Letters Patent is hereby corrected as shown below:

Column 1, line 29, delete "abovenoted" and insert therefor --above-noted--.

Column 6, line 28, delete "in" and insert therefor --is--.

Signed and Sealed this

Twenty-sixth Day of June 1984

[SEAL]

Attest:

GERALD J. MOSSINGHOFF

Attesting Officer

Commissioner of Patents and Trademarks